United States Patent
Srikant et al.

(10) Patent No.: US 6,862,574 B1
(45) Date of Patent: Mar. 1, 2005

(54) METHOD FOR CUSTOMER SEGMENTATION WITH APPLICATIONS TO ELECTRONIC COMMERCE

(75) Inventors: Sreedhar Srikant, Smyrna, GA (US); Ellen M. Boerger, Gainsville, GA (US); Scott W. Cunningham, Mountain View, CA (US)

(73) Assignee: NCR Corporation, Dayton, OH (US)

( * ) Notice: Subject to any disclaimer, the term of this patent is extended or adjusted under 35 U.S.C. 154(b) by 944 days.

(21) Appl. No.: 09/626,887

(22) Filed: Jul. 27, 2000

(51) Int. Cl.[7] ............................................... G06F 17/60
(52) U.S. Cl. ........................................ 705/10; 706/27
(58) Field of Search ............................... 705/10; 706/27

(56) References Cited

U.S. PATENT DOCUMENTS 6,128,624 A * 10/2000 Papierniak et al. ......... 707/104.1
6,430,539 B1 * 8/2002 Lazarus et al. ............... 705/10

FOREIGN PATENT DOCUMENTS

JP          09101984 A  *  4/1997  ........... G06F/17/60

OTHER PUBLICATIONS

Canada Newswire, Hummingbird Announces the Industry's first data mining solution with integrated data acquisition, Canada Newswire, Ottawa, Apr. 25, 2000 [PROQUEST] □□.*
Ungar et al., Radial Basis Function for Process Control, CIMPRO Proceedings, 1994 [GOOGLE].*
De Veaux et al., EMRBF: A Statistical Basis for Using Radial Basis Functions for Process Control, American Control Conference Proceedings, 1995 [GOOGLE].*
Thomaz et al., Design of Radial Basis Function Network as Classifier in Face Recognition Using Eigenfaces, SBRN Dec. 1998 [GOOGLE].*
Sereno et al., A Comparative Study of MLP and RBF Neural Nets in the Estimation of Foetal Weight and Length, 11th Portuguese Conference on Pattern Recognition, Porto, May 11–12, 2000 [GOOGLE].*
Edelstein, Mining for Gold, Information Week, Apr. 21, 1997, p. 53–70, [PROQUEST].*
Cadez et al., Visualization of Navigation Patterns on a Web Site Using Model Based Clustering, Technical Report MSR–TR–00–18, Microsoft Research, Microsoft Corporation, Mar. 2000 [GOOGLE].*
Linhart, Mixture of Gaussians and RBF's, Computational Learning Course class notes, May 3, 1998 [GOOGLE].*
Gargano, Data Mining—A Powerful Information Creating Tool, OCLC Systems and Services, vol. 15, Issue 2, 1999, p. 81 [PROQUEST].*
PR Newswire, IntelliQuest Adopts Trajecta's dbProphet™ Predictive Modeling Software, Pr Newswire, New York, May 11, 1998, p. 1 [PROQUEST].*

* cited by examiner

Primary Examiner—Tariq R. Hafiz
Assistant Examiner—Michael C. Heck
(74) Attorney, Agent, or Firm—Lowe Hauptman Gilman & Berner, LLP; Paul W. Martin

(57) ABSTRACT

The customer segmentation software according to the present invention automatically finds or creates profiles of prototypical customers in a large e-commerce database. The software matches all existing customer data in the database to one or more of the prototypical customers. The resulting customer segmentation is an effective summarization of the database and is useful for a range of business applications. Applications of the customer segmentation system include the development of customized web sites, the creation of targeted promotional offers and the prediction of consumer behavior.

5 Claims, 2 Drawing Sheets

METHOD FOR CUSTOMER SEGMENTATION WITH APPLICATIONS TO ELECTRONIC COMMERCE

FIELD OF THE INVENTION

The present invention relates generally to e-commerce, and more particularly, to a method of customer segmentation using a Gaussian mixture model. Even more particularly, the present invention relates to a method of handling missing data when using a Gaussian mixture model. Still even more particularly, the present invention is related to a method of handling missing data using a radial basis function.

BACKGROUND OF THE INVENTION

There are a variety of prior implementations for customer segmentation. Some of these implementations are purely algorithmic, others are implemented in statistical packages. Still others utilize on-line analytical processing tools. The software builds upon prior algorithms known as "Gaussian mixture models".

The drawback to prior art Gaussian mixture models is that the models are not capable of handling sparse, incomplete, or uncertain data. Accordingly, a need exists in the art for a Gaussian mixture model which can predict missing or uncertain data.

SUMMARY OF THE INVENTION

It is, therefore, an object of the present invention to provide a customer segmentation tool which can handle sparse, incomplete or uncertain data.

It is another object of the present invention to provide a Gaussian mixture model for customer segmentation which uses radial basis functions for handling sparse, incomplete or uncertain data.

The present invention enhances current Gaussian mixture models by its capability of handling missing data. The associated algorithm assembles a complete picture of customers despite the presence of sparse, incomplete or uncertain data. When unknown quantities of predictive interest are involved (including predictions of customer lifetime value, promotional responsiveness or purchase propensities) the algorithm estimates likely behavior based upon existing customers in the database.

The present invention improves upon equivalent implementations in statistical packages. First, the customer segmentation tool can handle sparse, incomplete or uncertain data. Second, the customer segmentation tool is developed for specific application in electronic commerce. Consequently, the customer segmentation tool considers both the data available to electronic retailers and the problems of interest to electronic retailers. Generic statistical tools do not have an equivalent business focus.

The present invention is more automated than equivalent on-line analytical processing tools. The core algorithm is based upon techniques of machine learning. Consequently the program can seek out and find patterns in the data with little or no human manual intervention in the data. On-line analytical processing tools require a great deal of human effort and judgment to find patterns across large, multidimensional data sets. OnLine Analytical Processing (OLAP) are not automated tools for segmentation.

The customer segmentation software according to the present invention automatically finds or creates profiles of prototypical customers in a large e-commerce database. The software matches all existing customer data in the database to one or more of the prototypical customers. The resulting customer segmentation is an effective summarization of the database and is useful for a range of business applications. Applications of the customer segmentation system include the development of customized web sites, the creation of targeted promotional offers and the prediction of consumer behavior.

The current implementation of customer segmentation has several advantages. First, it is customized to e-commerce data and fully considers the range of data available to e-commerce retailers. Second, the current implementation is fully automated, requiring a minimal amount of human direction in finding reproducible patterns of customer behavior. Third, the customer segmentation algorithm advances the state of the art by handling incomplete and missing data, and well as inputting or predicting likely values for incomplete customer records.

There are three innovative concepts in the software and algorithm. The first concept is the use of a business-oriented user interface to guide a statistical process of segmenting the data. The second innovative concept is the novel combination of Gaussian mixture models for describing the data, and radial basis functions to predict the data. The third innovative concept is the variety of outputs designed to help interpret and implement the model.

These and other objects of the present invention are achieved by providing a method of segmenting e-commerce data stored in a database, including selecting a plurality of segmentation variables, choosing an e-commerce business model, and grouping variables for clustering customers into segments.

The foregoing and objects of the present invention are achieved by providing a method of describing data and predicting missing data stored in a database. A Gaussian mixture model algorithm is applied to the data stored in the database to assess the similarity of customer profiles to existing customer profiles. The missing data is predicted using the Gaussian mixture model.

The foregoing and other objects of the present invention are achieved by a method of describing data and predicting missing data stored in a database. A plurality of segmentation variables are selected. An e-commerce business model is chosen. Variables are grouped for clustering customers into segments. A Gaussian mixture model algorithm is applied to the data stored in the database to assess the similarity of customer profiles to existing customer profiles. The missing data is predicted using the Gaussian mixture model.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for customer segmentation with applications to electronic commerce are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
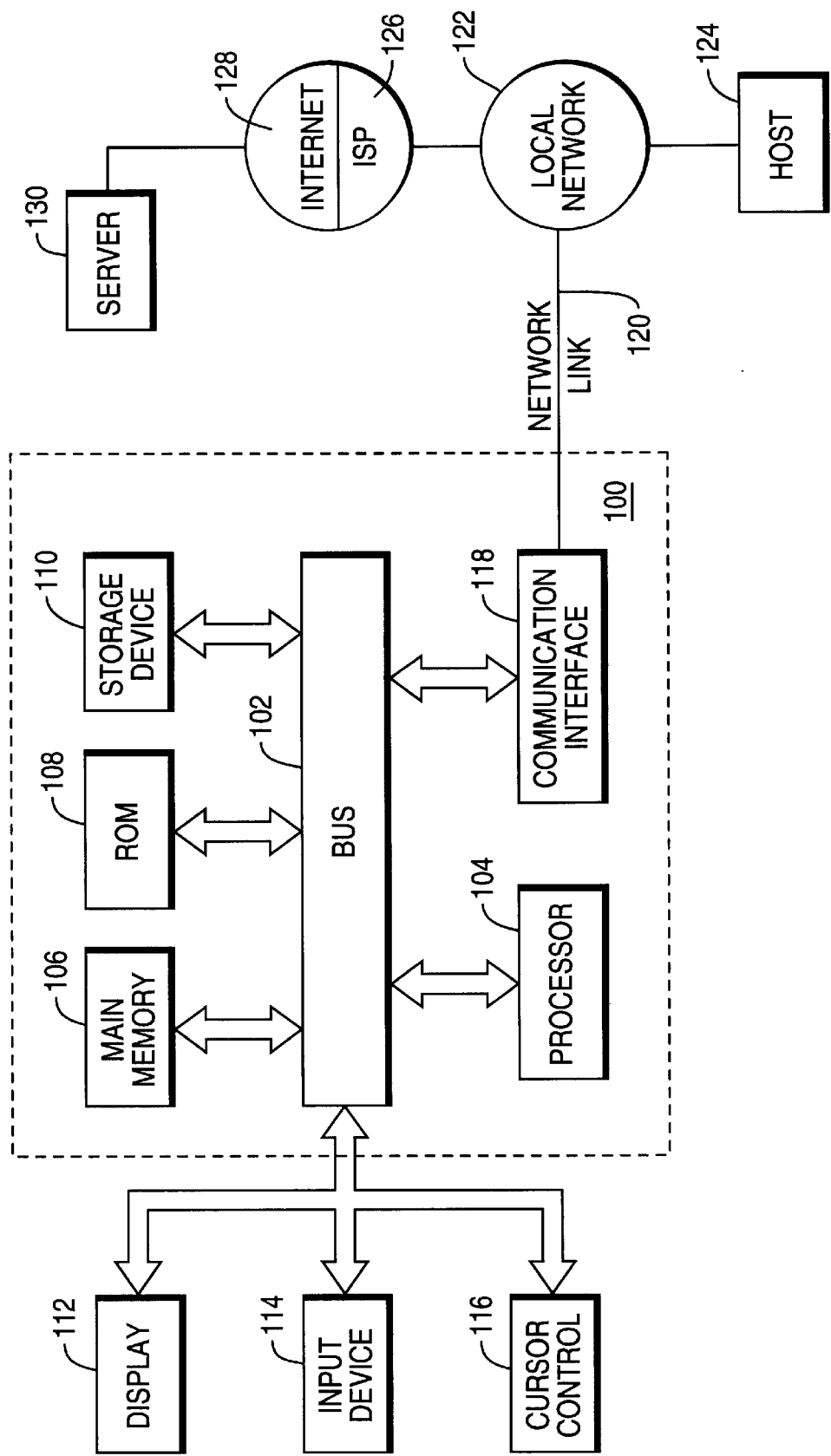
FIG. 1 is a high level block diagram of a computer system usable with the present invention.

FIG. 1 is a block diagram illustrating an exemplary computer system 100 upon which an embodiment of the invention may be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g.,) allowing the device to specify positions in a plane.

The invention is related to the use of a computer system 100, such as the illustrated system, to segment customers using a business-oriented user interface, to predict missing data and to provide a variety of outputs based on the customer segmentation. According to one embodiment of the invention, the customer segmentation is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 118 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection toga compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission or receipt of the customer segmentation data. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electro-magnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for information discovery and visualization as described herein.

The received code may be executed by processor 104 as it is received, and/or stored in storage device 110, or other non-volatile storage for later execution. In this manner, computer system 100 may obtain application code in the form of a carrier wave.

Figure 2:
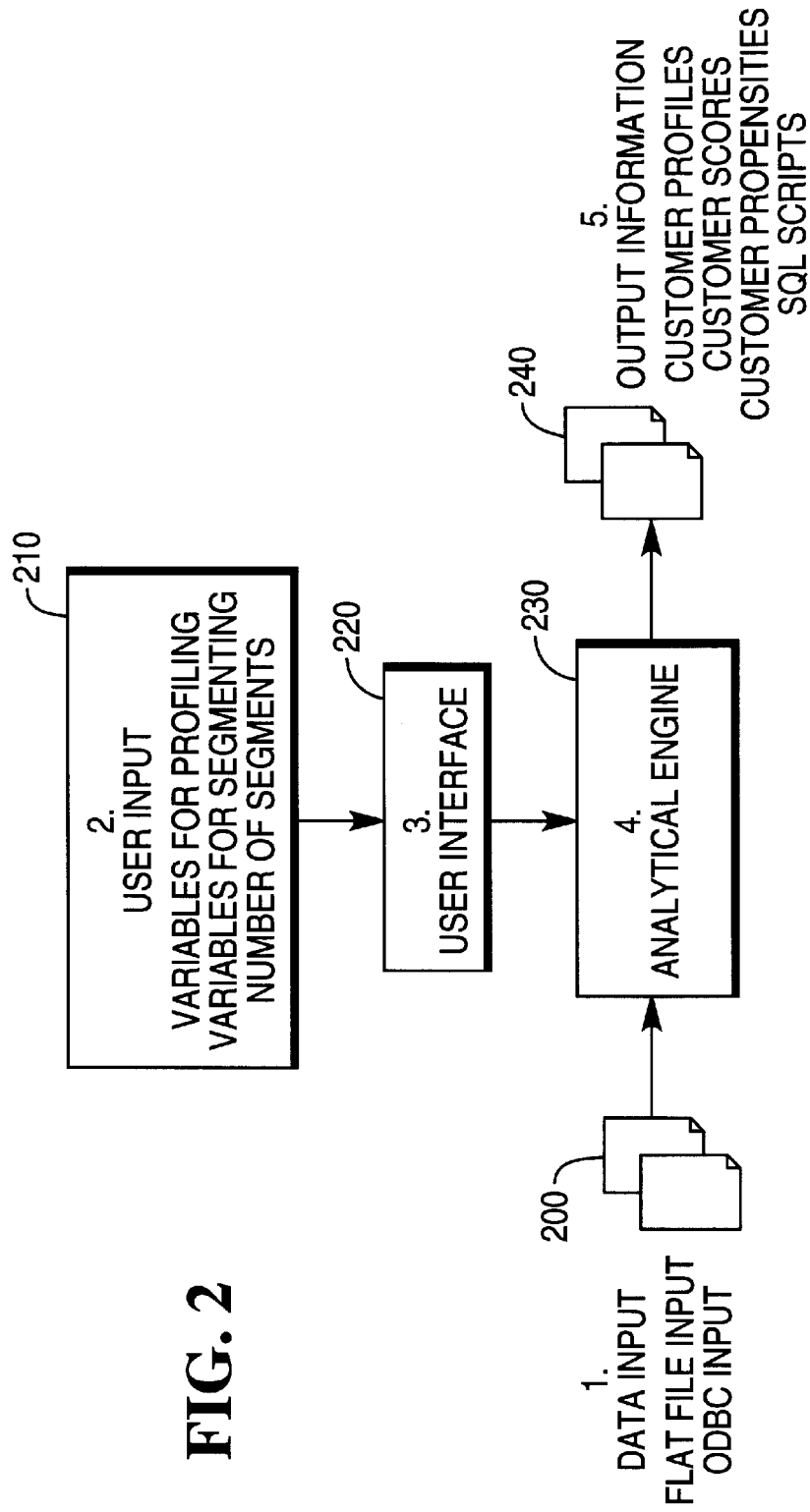
FIG. 2 is an illustration of a logical architecture of a customer segmentation tool according to the present invention.

The present invention includes five basic components as depicted in FIG. 2. The first component 200 is data input, the raw data for the analysis which can be stored in the storage device 110. This data can be input, for example, in a flat file format or a relational database format such as ODBC. The second component 210 is the user input, the business information that drives the analysis. This business information includes variables for profiling, variables for segmenting and the number of segments. The third component 220 is the user interface, which structures the segmentation process. The fourth component 230 is the analytical engine, a special form of Gaussian mixture models. The fifth component 240 is the information that is output from the segmentation which includes output information, customer profiles, customer scores, customer propensities and SQL scripts. Component four is written in C++ for computational efficiency, the remainder of the tool is written in Java.

Table 1 lists a set of recommended customer variables which can be used for component one from a general merchandise store. This information can be extracted from a warehouse of electronic commerce data taken from component 200. The segmentation tool 210 is not limited to these variables, though these variables represent a good starting choice for many retailers.

TABLE 1

| Number | Variable Name |
|---|---|
| 1 | Customer Age (years) |
| 2 | Customer Income ($ 000) |
| 3 | Customer Urban (logical, percent) |
| 4 | Households with Children (logical, percent) |
| 5 | Occupation: White Collar (logical, percent) |
| 6 | Race/Ethnicity: White (logical, percent) |
| 7 | Banner ad response (multiple, percent) |
| 8 | Number of Distinct IP Addresses |
| 9 | IP origination: dot EDU (multiple, percent) |
| 10 | IP origination: dot COM, dot NET (multiple, percent) |
| 11 | IP origination: dot GOV, all others (multiple, percent) |
| 12 | IP origination: international (multiple, percent) |
| 13 | Registration (logical) |
| 14 | Frequency of Visit (days) |
| 15 | Recency of Visit (days) |
| 16 | Total Number On-line Sessions |
| 17 | Average Time of Visit (24 hr EST) |
| 18 | Browsing Duration (min) |
| 19 | Browsing Bandwidth (kbytes/session) |
| 20 | Probability of Suspended Session |
| 21 | Probability of Help Desk Request |
| 22 | Browsing Emphasis Men's Store (mixture, percent) |
| 23 | Browsing Emphasis Women's Store (mixture, percent) |
| 24 | Browsing Emphasis Kids Store (mixture, percent) |
| 25 | Abandoned Market Basket (percent) |
| 26 | Promotional Response (percent) |
| 27 | Probability of Purchase (percent) |
| 28 | Average Amount of Purchase ($) |
| 29 | Average Purchase Margin ($) |
| 30 | Store Card Ownership (logical) |
| 31 | Informa Usage (logical) |
| 32 | Catalog List (logical) |
| 33 | Mainstream Merchandising Mix (mixture, percent) |
| 34 | Alternative Merchandising Mix (mixture, percent) |
| 35 | Sporty/Rugged Merchandising Mix (mixture, percent) |
| 36 | Return Items (percent) |
| 37 | Purchase Transhipment (percent) |

The analysis will vary according to the needs and goals of the retailer. In particular, the variables used for the separate tasks for segmentation, profiling and prediction might vary between the analyses.

Segmentation variables are used in the analysis to discover distinct groups of customers. Profiling variables are used to describe the similarities and differences between the customer segments. Choice of segmentation and profiling variables may be different according to the specific problem involved. Prediction variables consist of missing data of strategic interest that a retailer may want to know about a particular customer. Likely values can be predicted for this missing data based on other similar customers in the database. For instance, we may wish to know the long-term value of a customer who has registered at, but not yet purchased from, a web site.

The user interface (component 220) eases the selection of variables for segmentation, profiling and prediction. The user interface 220 does this by presenting groups of variables that are meaningful both in a business and a data mining context as presented in Table 2. The profiling screen considers five e-commerce business models that may be in use by a retailer. These business models range from virtual channel management (a retailer with a range of different sales channels), to advertising brokerage (commerce sites whose profit model is based on the sale of advertising), to content management (a site which sells its content, rather than a product, as a means of profit). The specific business model helps determine the variables and customer profiles that are going to be of most interest to a given retailer.

TABLE 2

| Business Model | Profit Model | Associated Variables for Profiling |
|---|---|---|
| Virtual Channel Management | Sales across multiple channel | Informa Usage, Catalog Usage, Store Card Usage, Purchase Transhipment |
| Low Cost Provision | Competition through low overhead on goods | Promotional Response, Help Desk Request, Returned Items, Probability of Purchase, Purchase Margin, Abandoned Market Basket |
| Advertising Brokerage | Profit from the sales of advertising | Demographic Variables, Banner Ad Response, Affiliate URL Referral, Distinct IP Addresses, IP Origination, Registration, Time of Day, Frequency of Sessions |
| E-Commerce Branding | Product differentiation through unique branding | Merchandising Mix, Total Number of On-Line Sessions, Purchase Amount |
| Content Management | Profitability derived from the web-site content | Recency of Purchase, Browsing Duration, Browsing Bandwidth, Browsing Emphasis, Suspended Session, Total Number of On-Line Session |

Similarly, the clustering screen groups variables for the segmentation of customers. This simplifies the task of choosing the right variables for comparing groups of customers. The buying process, a model of consumer behavior, helps to organize this information. The associated variables for clustering represent similar interests and attributes of customers, ensuring that like customers are compared with like customers as presented in Table 3.

TABLE 3

| Buying Process | Consumer Behavior | Associated Variables for Clustering |
|---|---|---|
| Intention Formation | Determining range of purchase choices | Recency, Informa Usage, Catalog Usage, Store Card Ownership, Banner Ad Response, Affiliate Referral URL |

TABLE 3-continued

| Buying Process | Consumer Behavior | Associated Variables for Clustering |
|---|---|---|
| Browsing | Looking for information about a specific purchase | Distinct IP address, IP Origination, Recency of Visit, Frequency of Visit, Time of Visit, Browsing Duration, Browsing Bandwidth, Suspended Session, Browsing Emphasis |
| Registration | Establishing an identity with a specific retailer | Demographic Variables, Registration |
| Purchase | Selecting and paying for an item | Abandoned Market Basket, Promotional Response, Purchase Responsibility, Amount of Purchase, Purchase Margin, Merchandising Mix |
| Evaluation | Determining personal satisfaction with the product | Returned Items, Transhipment, Help Desk Request |

The prediction screen considers groups of variables that relate to customer transactions, customer interactions, and customer expenses as presented in Table 4. Each group helps fill a specific information need about consumers. Transaction variables help establish the value of a given customer. Customer expenses help establish the costs of a given customer. Customer expenses help establish the costs of a given customer. Interaction information help in the prediction of the kinds of information or interaction a consumer may be expecting from a given commerce site. As previously mentioned, the software models segments of like-minded customers, allowing retailers to extend the information they do know about customers to model those customers about which they have only limited information.

TABLE 4

| Strategic Information | Variable Usage | Associated Variables for Clustering |
|---|---|---|
| Customer Transaction | These variables help establish the value or profitability associated with a given customer | Probability of Purchase, Average Amount of Purchase, Average Purchase Margin |
| Customer Expense | These variables help establish the costs associated with a given consumer | Browsing Bandwidth, Probability of Help Desk Request, Return Items |
| Customer Interaction | These variables help establish some of the ways a retailer can better interact with a customer | Banner Ad Response, Registration, Frequency of Visit, Recency of Visit, Total Number of On-line Sessions, Browsing Emphasis, Abandoned Market Basket, Merchandising Mix |

The analytical engine (software component 230) applies a Gaussian mixture model algorithm such as that described in G. J. McLachlan, G. J., T. Krishnan, "The EM Algorithm and Extensions", John Wiley & Sons, NY (1997). This algorithm applies Gaussian mixture models to model the known data. It uses all available data, even partial and incomplete information, to assess the similarity of a particular customer to the existing customer segments. Then, using the explicit statistical model of Gaussian mixtures, it predicts the remaining missing customer data. This prediction methodology is very close to the existing prediction approach known as radial basis functions. The resulting algorithm represents a hybrid graphical modeling architecture.

The estimation procedure used is the expectation-maximization approach. Table 5 below shows the key statistical quantities used in the algorithm.

TABLE 5

| Symbol | Definition |
|---|---|
| C(k) | Segment means matrix, for k segments |
| R(j) | Variable covariance matrix, for j variables |
| Pi(k) | Prior segment probabilities, for k segments |
| X(i,j) | Customer data, for i customers and j variables |
| H(i,k) | Responsibilities, for i customers and k segments. |

Formulae 7, 8 and 9 are the calculations used in Gaussian mixture models and radial basis functions. Like all expectation-Maximization algorithms we can initialize the model parameters at random (typically by creating a random guess at the responsibilities matrix). The algorithm then iterates through successive expectation, radial basis function and maximization steps until the algorithm converges on a solution. We use a matrix of booleans to indicate the presence or absence of missing data through our convergence. This matrix is not modified by the algorithm.

7. Expectation Formulae $$H(i, j) = \sum_k \sum_j Pi(k) f1(C, X);$$

where X(j) is defined f1(C,X) equals $\exp(-(C_k-X_j)^2/R_j)$, else f1(C,X) equals 0

8. Maximization Formulae $$C(k) = \frac{\sum_k \sum_j \sum_i H(i, j) X(i, j)}{\sum_j \sum_i H(i, j)}$$

$$R(k) = \frac{\sum_k \sum_j \sum_i H(i, j)(X(i, j) - C(j, k))^2}{\sum_j \sum_i H(i, j)}$$

$$Pi(k) = \frac{\sum_j \sum_i H(i, j)}{\sum_k \sum_j \sum_i H(i, j)}$$

9. Radial Basis Function Formulae
if X(i,j) is undefined $$X(i, j) = \sum_j \sum_k C(k) H(i, j)$$

Output information (component 240) includes three parts. The first part is a text description of the customer segments. This information aids in the interpretation and communication of the customer segments. The second part consists of the statistical output of the model including matrices C, R and Pi above, and the maximum likelihood fit of the model. The third part of the output is the predictive variables about customers and the customer assignment to specific segments. For simplicity, assume that the variables use din segmentation (refer to Table 1) are Customer Age, Customer Income and Registration (yes or no value). Depending on the data set, Sample segment 1 could include young customers with middle incomes who are registered customers. Sample segment 2 would include middle aged customers with higher incomes who are not registered. The fourth and final part is a SQL script, which aids in the production application of customer segmentation model. This automatically generated script allows large data warehouses to automatically be scored using the trained model.

There are three innovative concepts in the software and algorithm. The first concept is the use of a business-oriented user interface to guide a statistical process of segmenting the data. The second innovative concept is the novel combination of Gaussian mixture models for describing the data, and radial basis functions to predict the data. The third innovative concept is the variety of outputs designed to help interpret and implement the model.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of describing customer data stored in a database and predicting missing customer data for segmentation of the customer data, comprising:
    a) determining customer profiles by a computer;
    b) applying a Gaussian mixture model algorithm to the customer data stored an the database to assess a similarity of the customer profiles to existing customer profiles by the computer; and
    c) predicting the missing customer data by the computer using the Gaussian mixture model algorithm, including the steps of
       c-1) randomly initializing Gaussian mixture model parameters by the computer;
       c-2) applying an expectation formula, maximization formulae, and radial basis function formulae, to the customer data to obtain a solution for the messing data by the computer; and
       c-3) repeating step (c-2) until the solution for the missing customer data converges on a preferred solution by the computer.

2. The method of claim 1, wherein the expectation formula is:

$$H(i, j) = \sum_k \sum_j P_i(k) f_1(C, X);$$

where X(j) is define, $f_1(C,X)$ equals $\exp(-(C_k-X_j)^2/R_j$ else f1(C,X) equals 0, the maximization formulae are:

$$C(k) = \frac{\sum_k \sum_j \sum_i H(i, j) X(i, j)}{\sum_j \sum_i H(i, j)}$$

$$R(k) = \frac{\sum_k \sum_j \sum_i H(i, j)(X(i, j) - C(j, k))^2}{\sum_j \sum_i H(i, j)}$$

$$P_i(k) = \frac{\sum_j \sum_i H(i, j)}{\sum_k \sum_j \sum_i H(i, j)}$$

the radial basis function formula is:
if X(i,j) is undefined $$X(i, j) = \sum_j \sum_k C(k) H(i, j).$$

3. A method of describing data and predicting missing data stored in a database, comprising:
    a) applying a Gaussian mixture model algorithm to the data stored in the database to assess the similarity of customer profiles to existing customer profiles by a computer; and
    b) predicting the missing data using the Gaussian mixture model algorithm by a computer, including the steps of
       b-1) applying an expectation formula, maximization formulae and radial basis function formulae to the data stored in the database to derive a solution for the missing data;
       b-2) repeating step (b-1) until the model converges on a preferred solution.

4. A method of describing data and predicting missing data stored in a database, comprising:
    applying a Gaussian mixture model algorithm to the data stored in the database to assess a similarity of customer profiles to existing customer profiles by a computer;
    predicting the missing data using the Gaussian mixture model algorithm by the computer by applying an expectation formula, maximization formulae, and radial basis function formulae; and
    outputting matrices generated by the Gaussian mixture model algorithm and a maximum likelihood fit of the Gaussian mixture model algorithm.

5. The method of claim 4, further comprising outputting a textual description of customer segments.

* * * * *

UNITED STATES PATENT AND TRADEMARK OFFICE
CERTIFICATE OF CORRECTION

PATENT NO. : 6,862,574 B1
DATED : March 1, 2005
INVENTOR(S) : Srikant, S. et al.

It is certified that error appears in the above-identified patent and that said Letters Patent is hereby corrected as shown below:

Column 9,
Line 30, after "stored" delete "an" and substitute -- in --.
Line 40, after "the" delete "messsing" and substitute -- missing --.
Line 48, after "is" delete "define" and substitute -- defined --.

Signed and Sealed this

Twenty-fifth Day of October, 2005

JON W. DUDAS
*Director of the United States Patent and Trademark Office*